United States Patent

Novak et al.

Patent Number: 5,254,638
Date of Patent: Oct. 19, 1993

[54] COMPOSITE MATERIALS OF INTERPENETRATING INORGANIC AND ORGANIC POLYMER NETWORKS

[75] Inventors: Bruce M. Novak, Orinda; Mark W. Ellsworth, Berkeley, both of Calif.

[73] Assignee: The Regents of the University of California, Oakland, Calif.

[21] Appl. No.: 674,849

[22] Filed: Mar. 25, 1991

[51] Int. Cl.$^5$ .................. C08G 79/00; C08F 283/12
[52] U.S. Cl. .................. 525/389; 525/479; 525/903; 522/25; 522/28
[58] Field of Search ............. 525/479, 389, 903; 522/25, 28

[56] References Cited

U.S. PATENT DOCUMENTS

| | | | |
|---|---|---|---|
| 2,676,182 | 4/1954 | Daudt | 260/448.2 |
| 2,736,721 | 2/1956 | Dexter | 260/42 |
| 3,057,822 | 10/1962 | Rust et al. | 260/465 |
| 3,661,846 | 5/1972 | Kenney | 260/46.5 R |
| 4,125,703 | 11/1978 | Blount | 528/95 |
| 4,346,185 | 8/1982 | Blount | 524/5 |
| 4,468,499 | 8/1984 | Siegfried et al. | 525/301 |
| 4,584,365 | 4/1986 | Jada | 528/271 |
| 4,830,993 | 5/1989 | Legrand | 501/103 |
| 5,064,877 | 12/1991 | Nass et al. | 522/172 |

OTHER PUBLICATIONS

Schmidt, H. 1989 *J. Non-Crys. Sol.* 112, 419–423.
Ulrich, D. R. 1990 *J. Non-Crys. Sol.* 121, 465–479.
Huang, H. H. et al 1987 *Macromolecules* 20, 1322–1330.
Phillip, G. et al. 1984 *J. Non-Crys. Sol.* 63, 283,–292.
Wei, Y. et al. 1990 *Chemistry of Matrials* 2, 337–339.
Wilkes, G. L. et al 1990 *J. Am. Chem. Soc.* 12, 207–226.
Mark, J. E. et al 1987 *Polymer Bulletin* 18, 259–264.
Glaser, R. H. et al. 1988 *Polymer Bulletin* 19, 51–57.
Pope, E. J. A. et al 1989 *J. Mater. Res.* 4, 1018–1026.
Kohama, S. et al 1980 *J. Polym. Sci., Polym. Chem. Ed.* 18, 2357.
Abe, Y. et al 1982 *J. Polym. Sci., Polym. Chem. Ed.* 20, 205–210.
Abe, Y. et al. 1983 *J. Polym. Sci., Polym. Chem. Ed.* 21, 41–53.
Abe, Y. et al 1984 *J. Polym. Sci., Polym. Chem. Ed.* 22, 565–567.
Abe, Y. et al. 1984 *J. Polym. Sci., Polym. Chem. Ed.* 22, 761–767.

*Primary Examiner*—Melvyn I. Marquis
*Assistant Examiner*—Margaret W. Glass
*Attorney, Agent, or Firm*—Flehr, Hohbach, Test, Albritton & Herbert

[57] ABSTRACT

This invention relates to sol-gel methods for forming non-shrinking, high-glass composite materials and the products. Also taught is an inorganic-organic composite material having a solid interwoven network of an inorganic polymer matrix with interpenetrating polymerized alcohols. The inorganic matrix can be based on either Si or Ti atoms.

17 Claims, No Drawings

COMPOSITE MATERIALS OF INTERPENETRATING INORGANIC AND ORGANIC POLYMER NETWORKS

TECHNICAL FIELD OF THE INVENTION

This invention relates to sol-gel methods for forming non-shrinking, high-glass composite materials and the products.

BACKGROUND OF THE INVENTION

A traditional method of forming inorganic oxide glass requires melting of glass forming compounds, such as $SiO_2$, at high temperatures (e.g. greater than 1400° C.). A more recent method has been described for glass preparation which does not require such high temperatures. Using this method, known as the "sol-gel" method, the condensation of reactive metal oxide monomers can occur in the liquid phase at temperatures in the range of 25°-60° C. The sol-gel reaction is a two-step process during which metal alkoxides are hydrolyzed to form metal hydroxides, which in turn condense to form a three-dimensional network. The sol-gel products of inorganic components are generally sintered to produce hard and brittle glass.

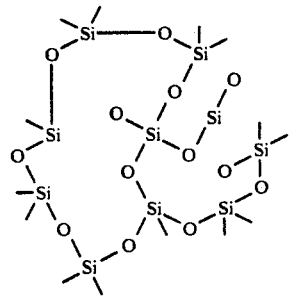

The sol-gel method allows composite materials made of inorganic (glass) and organic components which would not survive the very high temperatures of traditional glass making methods. Such a composite material can provide advantages resulting from the combination of the tensile strength and impact resistance of the organic polymer and the compressive strength of the inorganic matrix. The introduction of organic groups into glass can thus provide variations in properties such as strength, toughness, stiffness, brittleness, hardness, homogeneity, density, free volume, and thermal stability. Secondary considerations include resistance to corrosion, creep, and moisture. Both the strength and stiffness of a composite can be derived from the properties of the reinforcing fiber. Toughness results from the interaction between the matrix and the fibers. Such composite materials may be used in the manufacture of piezoelectric, ferroelectric, electro-optic, and superconducting fibers and films (Schmidt, H. 1989 *J. Non-Crys. Sol.* 112, 419-423; Ulrich, D. R. 1990 *J. Non-Crys. Sol.* 121, 465-479).

U.S. Pat. No 4,584,365 is directed to formation of a polymer of metal alkoxide wherein polymerization occurs between the $SiO_2$ groups. The alkoxide groups are not polymerized. Huang, H.H. et al (1987, *Macromolecules* 1987, 20, 1322-1330) reported the formation of a similar composite.

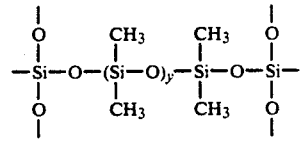

To further control and vary the properties of the composite, it is desired to incorporate polymerized organic groups within the glass network. Phillip, G. et al (1984 *J. Non-Crys. Sol.* 63, 283-292) reported the synthesis of a silaceous network cross-linked by chains of covalently bonded polymethacrylates. This method involved copolymerization of epoxysilane, methacryloxysilane, and a titanium tetralkoxide to form a flexible silaceous network suitable for use in contact lenses. This product was reported to have low shrinkage during curing (Schmidt, H. 1989 supra).

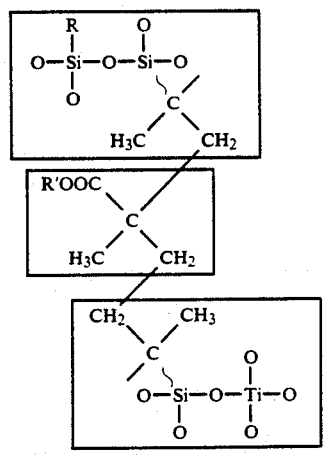

Wei, Y. et al (1990 *Chemistry of Material* 2, 337-339) reported the synthesis of composite materials by co-condensation of tetraethoxysilane with acrylate polymers containing triethoxysilyl groups. The resulting product was composed of covalently bonded organic and silicic groups.

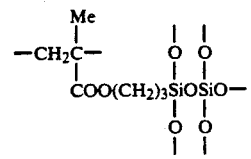

Wilkes, G. L. et al (1990 *J. Am. Chem. Soc.*) reported the incorporation of poly(dimetheylsiloxane) (PDMS) oligomers into a covalently bonded network with tetraethyloxysilane. The resulting material was inhomogeneous, with localized phase separation of the PDMS component.

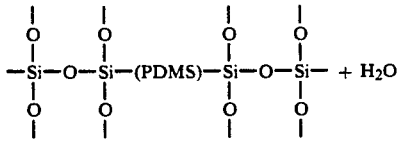

Polymer-modified glasses similar to the above structure based on silicon, titanium, and zirconium were synthesized by Mark, J. E. et al (1987 Polymer Bulletin 18, 259-264) and Glaser, R. H. et al. (1988 Polymer Bulletin 19, 51-57). In order to further control the properties of composites, is considered desirable to obtain composite materials in which the inorganic glass network and the organic polymer are interpenetrating, but not covalently bonded to each other. A silica gel-polymer composite was produced by impregnating a pre-prepared silica gel with methyl methacrylate monomer, then catalyzing the polymerization in situ of the methacrylate to polymethacrylate (Pope, E. J. A. et al 1989 J. Mater. Res. 4, 1018-1026). This method is limited by the necessity to preform the silica gel and by the requirement for homogeneous penetration of the monomeric species into the gel in order to produce a homogeneous composite.

SUMMARY OF THE INVENTION

This invention is directed to methods for forming an interwoven organic-inorganic solid composite material by forming a mixture of a precursor polymer, an alcohol, and a catalyst system. The precursor polymer has an inorganic polymer backbone of Si or Ti with linkages to polymerizable alkoxide groups. The catalyst system promotes the hydrolysis and polymerization of the alkoxide groups and the condensation of the inorganic backbone to form a solid interwoven network with the organic polymer chains interpenetrating the network.

It is a particular object of this invention to provide methods to produce a non-shrinking material composed of an inorganic silaceous matrix interpenetrated by organic polymers.

It is a further object of this invention to provide methods to control the glass content of a composite material consisting of a silaceous matrix interpenetrated by organic polymers.

DETAILED DESCRIPTION OF THE INVENTION

Definitions

The term "network" refers to a glass composed of a three-dimensional array of interconnecting, covalently bonded oxides, usually silcaceous oxides.

The term "composite material" refers to a network containing organic polymers which occupy the spaces between glass components.

The term "interpenetrating polymers" refers to organic polymers which occupy the spaces in a network.

The term "substituted" refers to a poly(silicic) acid or a poly(titanic) acid in which an —OH group has been replaced by an —OR group, the R being a polymerizable alkoxide. Conversely, the term "unsubstituted" refers to a silaceous acid, a titanic acid, a poly(silicic) acid, or a poly(titanic) acid lacking any covalently bonded carbon atoms.

The term "degree of substitution" ("DS") is an expression for the percent of —OH groups on a poly(silicic) acid backbone which have been substituted by an —OR group. The degree of substitution is assessed by further substituting the residual —OH groups with trimethylsilane and measuring, using proton NMR, the ratio of —OR groups to trimethylsilane groups.

The term "non-shrinking" refers to a substance which maintains the same volume displacement from the start of synthesis to the final product.

The term "catalyst system" refers to one or more catalysts capable of catalyzing the recited reactions.

The term "free radical initiator" refers to a catalyst or a combination of catalysts which can promote the polymerization of organic monomers which have alkene groups, and which can also promote the condensation of inorganic polymers. Examples of free radical initiators include 1) UV light with or without azobisisobutyronitrile (AIBN); 2) temperatures over 60° C. under N2 atmosphere; 3) ammonium persulfate with sodium metabisulfite; and 4) ammonium persulfate with N,N,N',N'-tetramethylenediamine (TMEDA).

The term "ring-opening metathesis polymerizer" refers to a catalyst which can promote the polymerization of alcohol monomers which have a ring structure containing a double bond between two carbon atoms.

The term "condensing" refers to the combined hydrolysis and polymerization of an inorganic backbone.

This invention relates to a method for producing a non-shrinking material composed of organic polymers homogeneously embedded in an inorganic glass matrix.

According to the method of the present invention, 1) the starting solution can be designed so that the material does not shrink in volume during the sol-gel transition or during curing, and 2) the glass content of the final composite can be controlled.

The method of the present invention involves forming a mixture of a precursor polymer, an alcohol, and a catalyst system. The precursor polymer has an inorganic polymer backbone with the structure

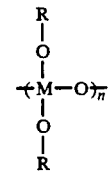

where M is Si or Ti, O is oxygen, and n is the number of repeating units. The number of repeating units, n, is sufficient to form a solid composite, initially at least about 20 to about 200 units. At least some (preferably at least about 5%) of the side chain oxygen atoms are bound to pendant polymerizable alkoxide moieties (R) through alkoxide linkages. For simplicity, the description will refer to Si as the specific M. The catalytic system hydrolyzes at least a portion of the alkoxide linkages to release the alkoxide moieties to form alcohol monomers, and polymerizes the alcohol monomers to form organic polymers. Synchronously, the catalytic system hydrolyzes and condenses the inorganic polymer backbone to form a solid interwoven network with the organic polymer chains interpenetrating the network. Preferably, the network is at least about 20% of the total composite w/w.

Water is optionally but preferably present in the reaction mixture. When a stoichiometric amount of water is used, all components of the system are converted into either the organic or inorganic polymers, and no solvents or by-products remain which would require removal, e.g. by evaporation. Water is consumed during hydrolysis of alkoxide groups. Excess water requires evaporation, and a great excess of water would lead to shrinkage. Less than the optimum amount of water would lead to incomplete hydrolysis of the alkoxide groups, incomplete glass formation, and possibly weaken the resulting material. Suitably, the amount of water used may vary from stoichiometry by as much as 5% to 10% of the total volume of the starting solution. When the proportions of reagents in the starting solution are appropriately balanced, there is sufficient water to complete the hydrolysis reaction without substantial excess water during the transition from starting solution to the final product. This prevents substantial shrinkage (e.g. less than about 30% by volume). By carefully controlling the proportion of water, the material can be made to be "non-shrinking", which renders it to be a particularly effective molding material. The resulting composite material is composed primarily, and preferably essentially, of an inorganic silaceous network with organic polymer chains homogeneously embedded in, but not covalently bound to, the inorganic network.

The practice of the method uses a new starting material, a precursor polymer in the form of a poly(silicic) acid ester (PSAE). To synthesize the PSAE, a poly(silicic) acid is first prepared by the method as described (Daubt, W. H. et al, U.S. Pat. No. 2,676,182; Dexter, J. F., U.S. Pat. No. 2,736,721; Kohama, S. et al 1980 *J. Polym. Sci., Polym. Chem. Ed.* 18, 2357). The poly(silicic) acid formed in this hydrolysis process is a branched rather than a linear polymer. The number of branch points in these polymer chains may vary and all of the factors controlling branching are not completely understood.

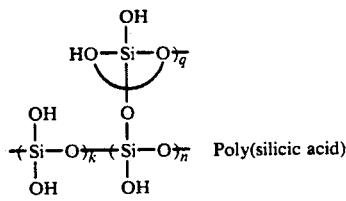

Poly(silicic acid)

In the above structure, the letters k, q, and n symbolize the number of repeating units, preferably between about 20 and 200 units. The poly(silicic) acid polymers are then reacted with a polymerizable alcohol to form a PSAE. Suitably, the polymerizable alcohol is selected from the group in Table 1, although there are many other possible polymerizable alcohols which could be used in the practice of this invention.

TABLE 1

Polymerizable alcohols employed in the formation of poly(silicic) acid esters.

| Monomer | Polymer | Polymerization Method |
|---|---|---|
| I hydroxyethylacrylate | | Free Radical |
| II oxabicyclo[2,2,1]hept-5-ene-2-methanol | | ROMP |
| III bicyclo[2,2,1]hept-5-ene-2-methanol | | ROMP |
| IV 7-oxabicyclo[2,2,1]hept-5-ene 2,3-dicarbinol | | ROMP |

The esterification reaction of poly(silicic) acid with an alcohol, wherein an —OH group of the acid is replaced by an —OR group of the alcohol, results in a poly(silicic) acid ester (PSAE) which has the general formula

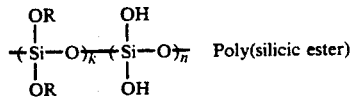 Poly(silicic ester)

wherein R is the polymerizable moiety resulting from the esterified alcohol (Table 1). The letters k and n represent the numbers of repeating units, preferably between about 20 and about 200. The esterification of poly(silicic acid) has been described (the exchange of the —OH groups on the silicon centers with —OR, alkoxide groups from simple alcohols such as benzyl alcohol) (Abe, Y. et al 1982 *J. Polym. Sci. Polym. Chem. Ed.* 20, 205; Abe, Y. et al 1983 *J. Polym. Sci. Polym. Chem. Ed.* 21, 41; Abe, Y. et al 1984 *J. Polym. Sci. Polym. Chem. Ed.* 22, 565; Abe, Y. et al 1984 *J. Polym. Sci. Polym. Chem. Ed.* 22, 761). However, this application contains the first description of a PSAE containing a polymerizable moiety.

Suitably, the alcohol used in esterification is hydroxyethyl acrylate, which results in the PSAE shown below (PSAE I).

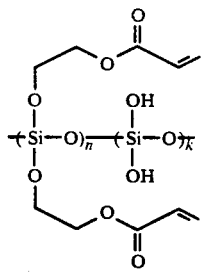

PSAE I

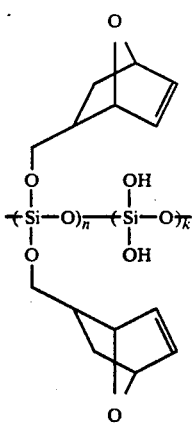

PSAE II

Alternatively, the alcohol used in esterification is 7-oxabicycol[2.2.1]hept-5-ene-2-methanol, which results in the PSAE shown below (PSAE II).

The degree of substitution (DS, alkoxide for hydroxide in the resulting PSAE is determined by the alkoxide used and reaction conditions. The term "DS" is defined as the total number of substituted —OR moieties divided by the total number of —OH groups which were available for substitution on the starting silicic acid polymer. Preferably, DS values are about 1-100%, more preferably 25-75%, most preferably 45-70%. The DS, together with the number of branch points in the poly(silicic) acid chain will determine the glass content of the final product. The theoretical glass contents of the final composites for the polymerization of PSAE II are shown in Table 2.

TABLE 2

| Polymer | General Expression $\left(\dfrac{1}{\% \text{ Glass}}\right)$ | % Glass | Comments |
|---|---|---|---|
| $\begin{array}{c} \text{OR} \\ \mid \\ +\text{Si}-\text{O}+_n \\ \mid \\ \text{OR} \end{array}$ | $= 1 + \dfrac{2(MW)}{60.09}$ | 19 | Fully Substituted Poly(silicic acid) |
| $\begin{array}{c} \text{OR} \\ \mid \\ \text{RO}-\text{Si}-\text{O}+_n \\ \mid \\ \text{OR} \quad \text{O} \\ \mid \quad \mid \\ +\text{Si}-\text{O}+_n+\text{Si}-\text{O}+_m \\ \mid \quad \mid \\ \text{OR} \quad \text{OR} \end{array}$ | $= \left(\dfrac{1}{n} + \dfrac{1}{m}\right) + \dfrac{MW}{60.09}\left(\dfrac{2}{n} + \dfrac{1}{m}\right)$ | 19-32% | Fully Substituted Poly(silicic acid) but with Branch Points (m) |

TABLE 2-continued

General Expression

| Polymer | $\left(\dfrac{1}{\% \text{ Glass}}\right)$ | % Glass | Comments |
|---|---|---|---|
| $\begin{array}{c} \text{OR} \\ | \\ \text{RO}-\text{Si}-\text{O}\!\!\not{)}_{\overline{n}} \\ | \\ \text{OR} \end{array}$ $\begin{array}{ccc} & \text{O} & \text{OH} \\ & | & | \\ +\text{Si}-\text{O}\!\!\not{)}_{\overline{n}}+\text{Si}-\text{O}\!\!\not{)}_{\overline{m}}+\text{SiO}\!\!\not{)}_{\overline{p}} \\ | & | & | \\ \text{OR} & \text{OR} & \text{OH} \end{array}$ | $= \left(\dfrac{1}{n}+\dfrac{1}{m}+\dfrac{1}{p}\right)+\dfrac{MW}{60.09}\left(\dfrac{2}{n}+\dfrac{1}{m}\right)$ | 19–100% | Poly(silicic acid) with Varying Degrees of Substitution and Branch Points |

$R = $ [norbornene epoxide structure with CH$_2$OH]

MW = 126.16

Table 2, Legend
The theoretical glass content of composites formed from precursor polymer PSEA II calculated as a function of both the degree of substitution (DS) and the number of branch points in the polymer chain. MW = the molecular weight of the alkoxide group; n = the number of siloxide groups having 2 —OR moieties (note that this n refers to a different repeating unit than that depicted for poly(silicic acid) supra); m = the number of siloxide groups having 1 —OR moiety; p = the number of siloxide groups having zero alkoxide moieties; 60.09 is the molecular weight of SiO2. The factor 2 reflects the two R groups on n; the factor 1 reflects the one R group on m. Glass content increases as a function of increasing numbers of siloxide groups having one or zero R moieties. Example: a theoretical glass content of 100% would be achieved when there are zero total R moieties (n = 0, m = 0, p = 1). The lowest theoretical glass content is achieved when every —OH group is substituted by an —OR group (n = 1, m = 0, p = 0).

In the preferred embodiment of this invention, the precursor polymer (PSAE) employed is soluble in its parent alcohol so that the alcohol can be used as a solvent for the reaction. Both PSAE I and PSAE II are soluble in their parent alcohols, and solutions of these polymers can be used in nonshrinking sol-gel formulations. However, other alcohols similar to the parent alcohol may also be used as the solvent so long as the precursor polymer is soluble in it.

Suitably, the alkoxide groups are hydrolyzed from the silaceous polymer backbone to form alcohol monomers which are then polymerized to form organic polymers. Some of the alkoxide groups may polymerize while still bound to the silaceous backbone, but thermodynamic forces in the reaction promote the subsequent hydrolysis and release of most or all of the alkoxide polymer from the backbone. In the preferred embodiment of the invention, the silaceous backbone self-condenses in synchrony with the self-polymerization of the organic alcohols, thus forming a solid interwoven silaceous network with the organic polymer chains interpenetrating the network.

Suitably, the hydrolysis, polymerization, and condensation reactions are promoted by a catalyst system.

When the alkoxide or alcohol structure is characterized by alkene groups, free radical catalysis is employed. One example of an alcohol suitable for free radical polymerization is listed in Table 1 (I). It is understood that there may be many polymerizable alcohols that can be employed in practicing this invention with free radical catalysis. In a preferred embodiment of the invention, the catalyst system is composed of ammonium persulfate, and N,N,N',N'-tetramethylethylenediamine. This free radical catalyst system may also promote the condensation of the inorganic polymer backbone, although not as efficiently as it promotes the organic monomer polymerization.

When the alkoxide or alcohol structure has a ring formation with an ethylenically unsaturated carbon-carbon bond, ring-opening metathesis polymerization (ROMP) catalysis may be employed. Table 1 lists several alcohols suitable for practicing this invention through use of ROMP catalysis. In a preferred embodiment of the invention, the ROMP catalyst for polymerization of the organic moieties is the ruthenium ion derived from K2RuCl5 added to the starting solution. The chloride ion derived from the same compound may promote the condensation of the inorganic backbone as well, however the inorganic condensation reaction catalyzed by chloride may proceed at a slower rate than the polymerization of organic moieties. Other ruthenium salts which may be employed as ROMP catalysts include Ru(H2)6(C7H7SO3)2 and RuCl3.nH2O.

In order to promote the hydrolysis condensation of inorganic backbone synchronously with polymerization of organic moieties an additional catalyst is preferably used, typically selected from the group consisting of acids, bases, chloride ions, and fluoride ions. In a preferred embodiment of the invention, NaF is added as part of the catalyst system to produce fluoride ions which act to condense the inorganic backbone at a rate comparable to the polymerization of the organic moieties. This synchronous polymerization of organic and inorganic groups produces a composite material with organic polymers homogeneously distributed within the glass network.

Other catalyst systems could be used in practicing this invention, including those described above in the definition of the term "catalyst system".

Suitably, the precursor polymer PSAE is dissolved in its parent alcohol to form a solution to which the catalyst is added. Not all PSAE's are soluble in their parent alcohols. Certain non-parent alcohols may also be suitably used as solvents in practicing this invention. Suitably, the amount of free alcohol employed (e.g. about 1:1, w/w) is sufficient to substantially dissolve the PSAE. When the parent alcohol is used, the free alcohol solvent molecules participate in the organic polymerization, becoming part of the organic polymers, and thus are essentially consumed in the reaction.

In one preferred embodiment of the invention which employs free radical catalysis, the starting solution is composed of PSAE I, the parent alcohol tetraalkoxyorthosilicate and water. The glass content of the resulting composite material is determined by the DS in the precursor polymer, the amount of free alcohol used as a solvent, and the number of branching points along the polymer chain (Table 2). In practicing this invention, the above values may be varied to achieve glass contents ranging from about 20% to about 70%. The percentage of glass considered desirable depends on the intended use of the composite material.

In one preferred embodiment of the invention employing ROMP catalysis, precursor polymer PSAE II is dissolved in its parent alcohol II with water. The reaction proceeds to gelation within minutes, and within about one hour the material has a rubbery consistency. The material may then be treated at about 100° C. for about 24 hours to yield a hard material. The resulting material is a non-shrinking glass composite which contains approximately 19% to 70% glass. The glass content can be determined by varying the above proportions and the DS of PSAE II (Table 2).

Further control over the glass content can be achieved by mixing the PSAE with unsubstituted poly(silicic) acid. In a preferred embodiment of the invention, PSAE II and its parent alcohol II are combined with poly(silicic) acid in the proportions of one to one (g:g) and reacted with ROMP catalysis as above. The resulting composite has a glass content of about 50% depending on the branching of the poly(silicic) acid and on the DS of the PSAE. By systematically varying the ratios of poly(silicic) acid, PSAE, and the free alcohol used as co-solvent, non-shrinking composites with a glass content from 20% to greater than 90% can be obtained. It should be noted that the equations shown in Table 2 do not apply when free silicic acid is added to the reaction mixture.

EXAMPLE 1

Formation of polysilicic acid esters

Poly(silicic acid) was prepared by the acid catalyzed hydrolysis of sodium metasilicate ($Na_2SiO_3$) in water according to the method described (Daubt, H. et al suora: Dexter, J. F. suora; Kohama, S. et al supra). Once formed, the poly(silicic acid) was extracted into tetrahydrofuran (THF) by addition of NaCl to the aqueous layer. The poly(silicic) acid formed in this hydrolysis process is a branched rather than a linear polymer. The polysilicic acid was then esterified by slow addition of a polymerizable alcohol, selected from Table 1, to the THF and subsequent azeotropic distillation with an excess of the same alcohol to produce the corresponding soluble poly(silicic acid) ester.

When the alcohol used was I (Table 1) poly(silicic) acid (3.0 g) was first dissolved in a mixture of THF (200 ml) and alcohol I (29 g, 0.25 mol) and the resulting solution was brought to reflux (about 85° C.). A THF/$H_2O$ mixture (175 ml) was distilled off at this temperature and the substituted poly(silicic acid) ester was precipitated from the remaining solution by the addition of hexane. The resulting ester product, PSAE I, had a degree of substitution (DS) of 65%.

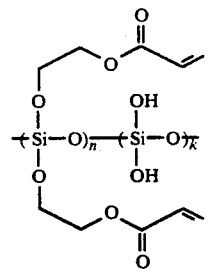

PSAE I

When the alcohol used was II (Table 1), the ester product was PSAE II, and the DS was 50%.

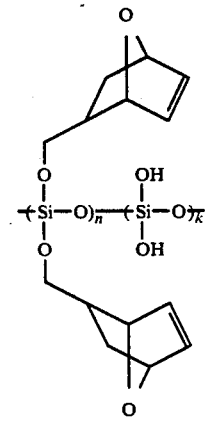

PSAE II

EXAMPLE 2

Formation of non-shrinking, high glass composite using free radical catalysis.

PSAE I (1.0 g, DS=65%) was dissolved in free alcohol I (1.0 ml) and water (0.25 ml). To this solution was added NaF (25 umol), ammonium persulfate (6.1 nM), and TMEDA (31 mM). The reaction proceeded to completion at room temperature within about one hour with no observable shrinkage. The resulting composite was transparent and contained approximately 30% glass as determined by elemental analysis.

EXAMPLE 3

Synthesis of non-shrinking, high glass composite material by ROMP catalysis.

PSAE II (1.0 g, DS =50%) was dissolved in a solution of free alcohol II (1.0 g) and water (0.25 ml). To this solution was added NaF (25 umol) and $K_2RuCl_5$ (0.005 g). The mixture was reacted at 60° C. for one hour, to produce a brown (due to the color of the Ru), non-shrinking composite with a glass content of about 30%.

EXAMPLE 4

Increase in glass content by adding unsubstituted poly(silicic) acid.

PSAE II (1.0 g) and poly(silicic) acid (1.0 g) were combined in a mixture of alcohol II (1.0 g) and 0.5 ml tetrahydrofuran (THF, as co-solvent), water (0.5 ml), NaF (100 umol) and $K_2RuCl_5$ (0.005 g). The reaction proceeded to completion within one hour at 60° C. to form a brown glass composite which did not shrink in volume. The percentage of glass in a composite synthesized by this type of protocol is typically about 40-60%.

This example demonstrates that poly(silicic) acid can co-condense with a PSAE to produce a monolithic glass composite.

What is claimed is:

1. A method for forming an interwoven organic-inorganic solid composite material comprising
   a) forming a mixture of a precursor polymer, a parent polymerizable alcohol, and a catalyst system, said precursor polymer comprising an inorganic polymer backbone chain with the structure

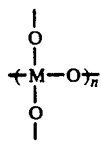

wherein M is Si or Ti, O is oxygen, and n is the number of repeating units and wherein at least a plurality of the side chain oxygen atoms are each bound to a pendant polymerizable alkoxide moiety through an alkoxide linkage.
   b) hydrolyzing at least a portion of said alkoxide linkages to release the linked alkoxide moieties from the remaining inorganic polymer backbone to form polymerizable alcohol monomers,
   c) polymerizing at least a portion of said alcohol monomers into organic polymer chains, and
   d) hydrolyzing and condensing said remaining inorganic polymer backbone to form a solid composite material comprising an interwoven network with the organic polymer chains interpenetrating said network, said catalyst system being capable of catalyzing hydrolysis of said alkoxide linkages, polymerization of said polymerizable alcohol monomers, and hydrolysis and condensation of said inorganic polymer backbone.

2. The method of claim 1 wherein said catalyst system includes a free radical initiator.

3. The method of claim 2 wherein said catalyst system includes ammonium persulphate and N,N,N',N'-tetramethylethylenediamine.

4. The method of claim 1 wherein said catalyst system includes a ring-opening metathesis polymerizer.

5. The method of claim 4 wherein said catalyst system includes K₂RuCl₅.

6. The method of claim 1 in which the portion of the catalyst system which hydrolyzes and condenses the inorganic polymer backbone is selected from the group consisting of acids, bases, chloride ions, and fluoride ions.

7. The method of claim 1 wherein said catalyst component includes NaF.

8. The method of claim 1 in which said mixture of step (a) further comprises water.

9. The method of claim 1 in which at least about 5% of said side chain oxygen atoms are linked to polymerizable alkoxide moieties in said precursor polymer.

10. The method of claim 1 wherein said polymerizable alkoxide moieties are formed by removal of the alcohol proton from a polymerizable alkenol.

11. The method of claim 1 wherein the mixture of step (a) further includes unsubstituted poly(silicic) acid, said method further comprising co-condensing said acid with the backbone in step (d).

12. The method of claim 1 wherein the volume of said solid composite material is no less than about 70% of the volume of the mixture of step (a).

13. An inorganic-organic composite material having a solid interwoven network of an inorganic polymer matrix with interpenetrating polymerized alcohols, wherein said inorganic matrix includes the structure

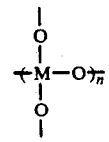

wherein M is Si or Ti, O is oxygen, nd n is the number of repeating units.

14. The composite material of claim 13 wherein M is Si.

15. A composite material having a three-dimensional silaceous network with interpenetrating organic polymers, said organic polymers having the structure

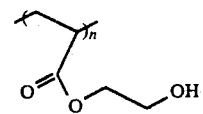

wherein n is the number of repeating units.

16. A composite material having a three-dimensional silaceous network with interpenetrating organic polymers, said organic polymers having the structure

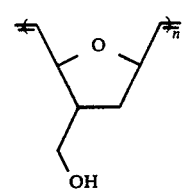

wherein n is the number of repeating numbers.

17. The method of claim 10 in which said alkenol is a cyclic alkenol.

* * * * *

UNITED STATES PATENT AND TRADEMARK OFFICE
CERTIFICATE OF CORRECTION

PATENT NO. : 5,254,638

DATED : October 19, 1993

INVENTOR(S) : Bruce M. Novak, Mark W. Ellsworth

It is certified that error appears in the above-indentified patent and that said Letters Patent is hereby corrected as shown below:

Column 1, line 42, following "allows", insert --the formation of hybrid--.

Column 3, line 13, the sentence beginning "In order to" should begin a new paragraph.

Columns 9 and 10, Table 2, Legend, in the first full line "polymer PSEA II" should read --polymer PSAEII"--.

Column 10, line 37, "$Ru(H_2)_6(C_7H_7SO_3)_2$" should read --$Ru(H_2O)_6(C_7H_7SO_3)_2$--.

Column 11, line 47, "suora:" should read --supra;".

Claim 13 at Column 14, line 27, "oxygen, nd n" should read --oxygen, and n--.

UNITED STATES PATENT AND TRADEMARK OFFICE
CERTIFICATE OF CORRECTION

PATENT NO. : 5,254,638
DATED : October 19, 1993
INVENTOR(S) : Bruce M. Novak, Mark W. Ellsworth It is certified that error appears in the above-indentified patent and that said Letters Patent is hereby corrected as shown below:

Claim 16 at Column 14, line 54, at the end of the line, "repeating numbers" should read --repeating units--.

Signed and Sealed this

Thirtieth Day of August, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,254,638

DATED : October 19, 1993

INVENTOR(S) : Bruce M. Novak, Mark W. Ellsworth

It is certified that error appears in the above-indentified patent and that said Letters Patent is hereby corrected as shown below:

On the Title Page, Item [73], the Assignee should read —The Regents of the University—.

Columns 9 and 10, Table 2, Legend, in the first full line "polymer PSEA II" should read —polymer PSAE II—.

Signed and Sealed this

Eleventh Day of October, 1994

Attest:

BRUCE LEHMAN

*Attesting Officer*      *Commissioner of Patents and Trademarks*